(12) United States Patent
Scott

(10) Patent No.: US 7,113,448 B2
(45) Date of Patent: Sep. 26, 2006

(54) WATER BOTTOM CABLE SEISMIC SURVEY CABLE AND SYSTEM

(75) Inventor: Gary Lee Scott, Sugar Land, TX (US)

(73) Assignee: PGS Americas, Inc., Houston, TX (US)

( * ) Notice: Subject to any disclaimer, the term of this patent is extended or adjusted under 35 U.S.C. 154(b) by 0 days.

(21) Appl. No.: 11/253,996

(22) Filed: Oct. 19, 2005

(65) Prior Publication Data

US 2006/0062080 A1 Mar. 23, 2006

Related U.S. Application Data

(62) Division of application No. 10/855,177, filed on May 27, 2004.

(51) Int. Cl.
*G01V 1/38* (2006.01)

(52) U.S. Cl. .......................... 367/20; 367/21

(58) Field of Classification Search .............. 367/20, 367/21, 153; 174/101.5
See application file for complete search history.

(56) References Cited

U.S. PATENT DOCUMENTS

| | | | |
|---|---|---|---|
| 3,710,006 A | 1/1973 | Davis | |
| 4,092,629 A * | 5/1978 | Siems et al. | 367/15 |
| 4,399,322 A | 8/1983 | Hafner, Jr. | |
| 4,486,865 A | 12/1984 | Ruehle | |
| 4,491,939 A | 1/1985 | Carpenter | |
| 4,636,998 A | 1/1987 | Greene et al. | |
| 4,935,903 A | 6/1990 | Sanders et al. | |
| 4,979,150 A | 12/1990 | Barr | |
| 5,471,436 A | 11/1995 | Harvey | |
| 5,621,700 A | 4/1997 | Moldoveanu | |
| 5,627,798 A | 5/1997 | Siems et al. | |
| 5,784,337 A * | 7/1998 | Rainey et al. | 367/154 |
| 6,108,267 A | 8/2000 | Pearce | |
| 2003/0174582 A1 | 9/2003 | Scott | |

* cited by examiner

*Primary Examiner*—Ian J. Lobo
(74) *Attorney, Agent, or Firm*—E. Eugene Thigpen; Richard A. Fagin

(57) ABSTRACT

A seismic sensor cable is disclosed. The cable includes an outer jacket disposed on an exterior of the cable. The outer jacket excludes fluid from entering an interior of the cable. A reinforcing layer disposed within the outer jacket, which includes at least one electrical conductor disposed therein. An inner jacket is disposed within the reinforcing layer, and at least one electrical conductor disposed within an interior of the inner jacket. Some embodiments include at least one seismic sensor electrically coupled to the at least one electrical conductor disposed in the reinforcing layer In some embodiments a housing is disposed over the electrical coupling of the sensor to the conductor. The housing is molded from a polyurethane composition adapted to form a substantially interface-free bond with the cable jacket when the polyurethane cures.

3 Claims, 8 Drawing Sheets

WATER BOTTOM CABLE SEISMIC SURVEY CABLE AND SYSTEM

CROSS-REFERENCE TO RELATED APPLICATIONS

This application is a divisional application of, and claims priority from, United States Nonprovisional patent application Ser. No. 10/855,177 filed on May 27, 2004, the entirety of which is incorporated herein by reference.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic survey systems. More particularly, the invention relates to marine seismic systems deployed on the floor or bottom of a body of water.

2. Background Art

Marine seismic survey systems known in the art include so-called "ocean bottom cables" (OBCs). OBCs are deployed on the bottom of the ocean or other body of water, beneath which it is desired to determine the geologic structure and rock characteristics. A typical OBC includes a plurality of seismic sensors at spaced apart locations along a cable. One or more seismic energy sources are towed in the water by one or more vessels, and are periodically actuated. Seismic signals detected by the sensors in the OBC are recorded, typically by a recording unit forming part of the OBC.

The sensors in an OBC typically include motion sensors, such as geophones or accelerometers. The motion sensors are typically packaged in such a way that the motion sensors are disposed along different sensitive directions. "Sensitive direction" means the direction along which the particular motion sensor is most sensitive to movement. As is known in the art, typical motion sensors are primarily sensitive to movement along a "principal axis" or principal direction, and are substantially insensitive to movement along any other direction. Having such motion sensors provides the OBC with the capacity to detect seismic energy propagating along a plurality of directions and to resolve the direction of such movement.

Typical OBCs also include pressure sensors or pressure gradient sensors, such as hydrophones, at spaced apart locations along the cable. Hydrophones generate a signal proportional to pressure change in the surrounding medium (the water). Having a pressure change signal related to seismic energy propagation, combined with motion signals along different sensitive directions, enables using many different techniques known in the art for interpretation of the signals so as to reduce the effects of acquisition artifacts such as water bottom multiple reflections and water layer multiple reflections. The multiple direction motion signals also enable interpretation of converted wave (compressional to shear) seismic signals, for determining properties of the subsurface earth formations such as amplitude versus offset (AVO) and directional anisotropy.

A number of "deghosting" and water layer effect attenuation techniques are known in the art for use with OBCs. One such technique is described in U.S. Pat. No. 4,486,865 issued to Ruehle. Pairs of detectors each comprise a geophone and a hydrophone. A filter is applied to the output of at least one of the geophone or hydrophone in each pair so that the frequency content of the filtered signal is adjusted. The adjustment to the frequency content is such that when the filtered signal is combined with the signal from the other sensor, the ghost reflections cancel.

U.S. Pat. No. 5,621,700 issued to Moldovenu also discloses using at least one pair of sensors in a method for attenuating ghosts and water layer reverberations.

U.S. Pat. No. 4,935,903 issued to Sanders et al. discloses a method for reducing the effects of water later reverberations which includes measuring pressure at vertically spaced apart depths, or by measuring pressure and particle motion using sensor pairs. The method includes enhancing primary reflection data for use in pre-stack processing by adding ghost data.

U.S. Pat. No. 4,979,150 discloses a method for marine seismic exploration in which output of substantially collocated hydrophones and geophones are subjected to a scale factor. The collocated hydrophones and geophones can be positioned at the sea floor or above the sea floor.

The foregoing description is intended to emphasize the potential benefits of seismic surveys acquired using OBCs. A limitation to using OBCs is that it takes a substantial amount of time to deploy OBCs, and specialized handling equipment is typically required to extend the OBC from a deployment vessel, and place the OBC on the water bottom. After deployment, it is often necessary to determine the exact position on the sea floor at which each sensor in the OBC ultimately comes to rest on the water bottom, because currents in the water, and viscous effects on the various components of the OBC may cause some of the sensors to come to rest at a different location than the location at the water surface of each sensor when the OBC was extended from the deployment vessel. It is also necessary to retrieve the OBC to access a recording device coupled to the OBC in order to make use of the signals generated by each of the sensors in the OBC. To survey a substantial geographic area using OBCs thus requires a number of deployments and retrievals of the OBCs used in any survey operation.

The need for repeated deployment and retrieval of OBCs has made it necessary for the various mechanical load handling components in a typical OBC to withstand repeated applications of axial stress along the OBC cable and along interconnecting devices that couple the various components of the OBC. It is also necessary for the various components of an OBC to withstand immersion in water, sometimes to substantial depth (as much as 1,000 meters). While it is well known in the art how to form cables, sensor enclosures and interconnecting devices for OBCs to withstand environmental and operational stresses such as the foregoing, the devices known in the art are frequently heavy, cumbersome and expensive to manufacture.

It is also known in the art to use modified versions of typical seismic sensing equipment intended for use on dry land, however, such modified land systems are typically suitable only for relatively shallow water depths (15 to 30 meters). There is a need for inexpensive to manufacture, rugged OBCs that are suitable for use in greater water depths than modified land-based sensor systems, and that are easier to deploy and retrieve than typical OBCs.

SUMMARY OF THE INVENTION

One aspect of the invention is a seismic sensor cable. A seismic sensor cable according to this aspect of the invention includes an outer jacket disposed on an exterior of the cable.

The outer jacket is adapted to exclude fluid from entering an interior of the cable. A reinforcing layer is disposed within the outer jacket. The reinforcing layer includes at least one electrical conductor disposed therein. An inner jacket is disposed within the reinforcing layer. At least one electrical conductor is disposed within an interior of the inner jacket. In one embodiment, the reinforcing layer is a fiber braid. In one embodiment, the outer jacket is formed from a polyurethane composition that forms a substantially interface-free bond with uncured polyurethane upon cure thereof.

Another aspect of the invention is a signal processing module for a seismic sensor system. A signal processing module according to this aspect of the invention includes a housing having at least one connector termination thereon. A circuit mounting frame is disposed within the housing. The frame is adapted to sealingly engage an interior surface of the housing so as to define a chamber sealed from fluid entering therein. The module includes signal processing circuits mounted to the frame within the chamber.

In one embodiment, the housing comprises at least two connector terminations. The two terminations include electrical connections to the signal processing circuits. The signal processing circuits are adapted to detect command signals originating from a recording unit operatively coupled to the module from one of the at least two terminations. The signal processing circuits are further adapted to electrically couple the other one of the at least two terminations to portions of the signal processing circuits adapted to receive signals from a seismic sensor.

Another aspect of the invention is a seismic data recording system. A system according to this aspect of the invention includes a recording unit. A first signal processing module is operatively coupled to the recording unit. A first seismic sensor cable is operatively coupled at one end to the first signal processing unit, and is operatively coupled at its other end to a second signal processing unit. The first seismic sensor cable has at least one seismic sensor operatively coupled thereto. A second seismic sensor cable is operatively coupled to the second signal processing unit. The second seismic sensor cable also has at least one seismic sensor operatively coupled thereto. The first signal processing unit and the second signal processing unit each have at least two electrical terminations thereon. The first and second signal processing units each have circuits therein adapted to detect command signals originating from the recording unit. The circuits are also adapted to selectively couple a data telemetry output to the one of the at least two terminations from which the command signals are detected. The circuits are further adapted to selectively couple the other of the at least two terminations to portions of the circuits adapted to receive signals from a seismic sensor.

Other aspects and advantages of the invention will be apparent from the description and claims that follow.

DETAILED DESCRIPTION

Figure 1:
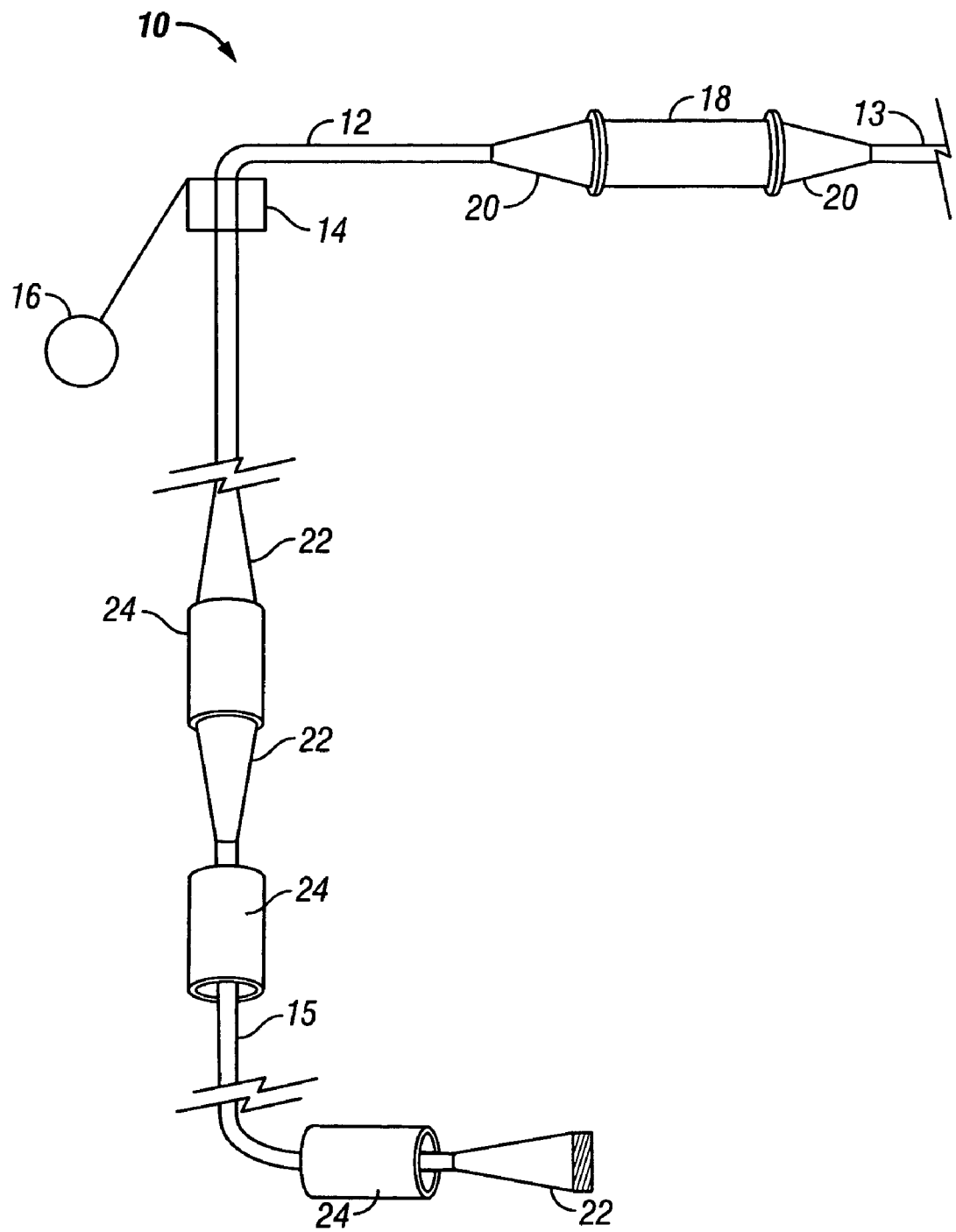
FIG. 1 shows principal components of one embodiment of an ocean bottom cable (OBC) seismic sensor and signal processing system according to the various aspects of the invention.

FIG. 1 shows principal components of an ocean bottom cable (OBC) seismic sensor and signal processing system ("system") according to the various aspects of the invention. The system 10 includes a signal processing module 18 that is coupled at one end to a seismic sensor cable 12. Various electronic circuits (explained below with reference to FIG. 2) inside the signal processing module 18 detect electrical signals generated by one or more seismic sensors, shown generally at 16, and convert the electrical signals into a suitable form for transmission and/or recording. The signal processing module 18 in the present embodiment may also be coupled at its other end to a data communication cable 13 having electrical conductors therein (not shown separately) for transferring the processed signals to a recording unit (not shown in FIG. 1) or to another (not shown in FIG. 1) signal processing module similar in configuration to the signal processing module 18 shown in FIG. 1. In other embodiments, the signal processing module 18 may be coupled at its other end to another seismic sensor cable (not shown in FIG. 1), similar in configuration to the seismic sensor cable 12 shown in FIG. 1.

The signal processing module 18 is coupled to the sensor cable 12 and to the data communication cable 13 (or to another sensor cable) by a pressure-sealed electrical/mechanical connector ("sealed connector") 20. One such sealed connector 20 is disposed at one end of the data communication cable 13. Another sealed connector is disposed at one end of the seismic sensor cable 12, as shown in FIG. 1. The internal structure of the sealed connector 20 will be further explained below with reference to FIG. 2. Internal structure of the signal processing module 18 will also be explained with reference to FIG. 2.

The seismic sensor cable 12 includes one or more sensor "takeouts" 14. Each sensor takeout 14 is a sealed, pressure resistant enclosure affixed to the exterior of the sensor cable 12. The takeout 14 includes within its interior electrical connections between electrical conductors (explained with reference to FIG. 4) disposed in an outer reinforcing braid (not shown in FIG. 1) in the cable 12 and one or more of the seismic sensors 16. As will be further explained, the takeout 14 also provides strain relief to the connection between the sensor 16 and the cable 12.

The seismic sensor 16 can be a single component geophone, a multiple component (typically three orthogonal components) geophone, a hydrophone, an accelerometer, combination hydrophone/geophone, or any other device known in the art for detecting seismic signals. The construction of the sensor cable 12 will be explained in more detail with reference to FIGS. 3A and 3B. The construction of the sensor takeout 14 will be explained in more detail with reference to FIG. 4. While the embodiment of the sensor cable 12 shown in FIG. 1 includes one sensor takeout 14, having one seismic sensor coupled at the takeout 14, other embodiments of a seismic sensor cable according to the invention may include more than one sensor takeout 14. Still other embodiments of a seismic sensor cable may include more than one seismic sensor coupled to the cable at each sensor takeout 14, or at any one or more such takeouts along a sensor cable.

The end of the seismic sensor cable 12 opposite to the end coupled to the signal processing module 18 may be terminated with an hermaphroditic connector 22. A like-configured hermaphroditic connector 22 is disposed at one end of a sensor extension cable 15. The two like-configured hermaphroditic connectors 22 are mechanically coupled to each other by an internally threaded coupling or ring 24 that engages corresponding threads on the exterior of each of the joined hermaphroditic connectors 22. In the present embodiment, the sensor extension cable 15 may or may not include additional seismic sensors (not shown in FIG. 1). Preferably, the sensor extension cable 15 includes a like-configured hermaphroditic connector 22 at both its ends, such that either end of the sensor extension cable 15 may be coupled to the hermaphroditic connector 22 on the end of the seismic sensor cable 12. It is also preferable to include one threaded coupling ring 24 for each end of the sensor extension cable 15. By having an hermaphroditic connector 22 and an associated threaded coupling ring 24 at each end of the sensor extension cable 15, mishandling of the sensor extension cable 15 (i.e., deploying the cable 15 backward) avoids having an incorrect cable termination arranged to mate with the corresponding hermaphroditic connector 22 on the end of the seismic sensor cable 12. Similarly, having an hermaphroditic connector at each end of the sensor extension cable 15 avoid having an incorrect termination arranged to mate two sensor extension cables end-to end. Construction of the hermaphroditic connector 22 will be explained in more detail with reference to FIG. 5.

Figure 2:
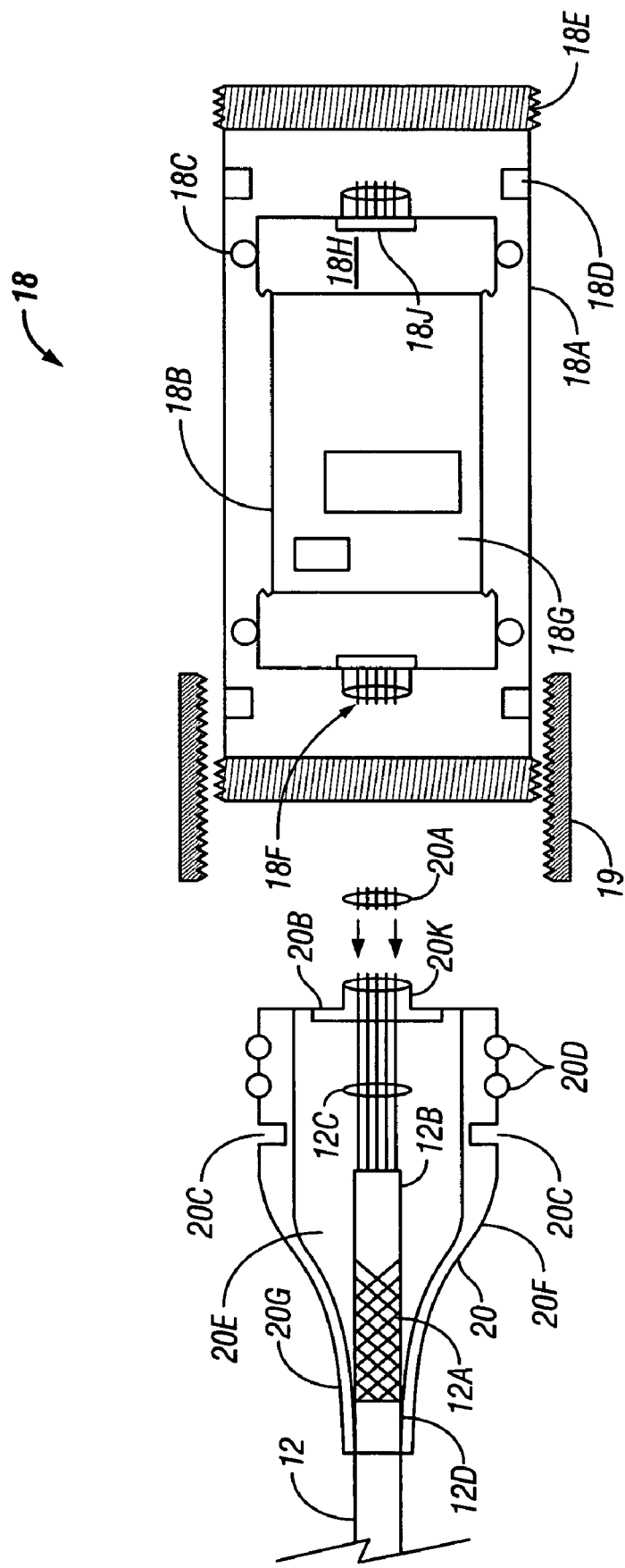
FIG. 2 shows internal construction of one embodiment of a pressure sealed connector and a signal processing module.

FIG. 2 shows one embodiment of the sealed connector 20 used to couple the sensor cable 12 to the signal processing module 18, and shows internal construction of the signal processing module 18 in more detail. In the present embodiment, the sealed connector 20 includes an outer shell 20F that can be molded from plastic. The shell 20F is preferably molded to as to define an interior space 20E. In the present embodiment, the plastic from which the shell 20F is molded is a fiber-filled polyurethane compound sold under the trade name HYDEX by the A. L. Hyde Company, Grenloch, N.J. Other types of plastic may be used in other embodiments, however one important attribute of the plastic is that it form a substantially interface-free bond with uncured plastic used to fill an interior space in the shell 20F during assembly of the connector 20. Attributes of such plastic compounds will be further explained. The shell 20F may also be molded to include suitable locations or grooves 20D for o-rings or similar sealing elements in order to form a fluid-tight seal against the inner surface of a housing 18A, when the connector 20 is engaged with the housing 18A. The housing 18A encloses electronic components of the signal processing module 18, which will be further explained. The shell 20F also may be molded to include a locking ring groove 20C to transmit axial load between the signal processing module housing 18A and the shell 20F.

The axial end of the shell 20F that mates with the housing 18A may include a recessed opening adapted to mate with one side of an electrical contact supporting wafer 20B. The electrical contact supporting wafer 20B is also preferably made from molded plastic, preferably the HYDEX compound referred to previously. The electrical contact supporting wafer 20B is molded to include electrical contacts 20A within the structure of the support wafer 20B. The electrical contacts 20A are arranged to enable mating with corresponding electrical contacts 18F disposed in the signal processing module 18. The electrical contacts 20A are preferably molded into the wafer 20B during fabrication of the wafer 20B so as to form a substantially impenetrable barrier to movement of fluid through the wafer 20B at the location of the electrical contacts 20A. Having the electrical contacts 20A thus molded into the wafer 20B can substantially prevent fluid entry into the interior of the connector 20 in the event the connector 20 becomes disengaged from the module 18.

In the present embodiment, the electrical contact supporting wafer 20B is preferably molded such that each of the electrical contacts 20A recessed into a small, open-ended cylindrical tube (not shown separately for clarity) which seals radially against a corresponding substantially cylindrical tube (not shown for clarity) enclosing each of the electrical contacts 18F in the signal processing module 18. By configuring the contact wafer 20B and the corresponding electrical contact supporting structure in the module 18 to have such sealing tubes, the electrical contacts 20A and 18F will be sealed against fluid intrusion even if other seal elements in the connector/housing arrangement (for example, o-rings in grooves 20C) fail.

The shell 20F preferably is molded to include a tapered exterior diameter, called a "bend radius transition" and shown at 20D, such that the bending stiffness of the connector 20 having the cable 12 therein gradually changes from relatively stiff at the joined end of the connector 20, to the bending stiffness of the cable 12, thus avoiding applying undue bending stress to the cable 12 where it joins the connector 20. Other embodiments may include a separately molded bend radius transition 20D molded from a softer (or more flexible) plastic than the plastic used to form the shell. Such separately molded bend radius transitions may be molded onto the shell 20F after assembly of the connector 20.

The axial end of the electrical contact support wafer 20B that is adapted to mate with the electrical contact portion of the signal processing module 18 includes a tubular extension having seal groove 20K in its exterior surface, suitable to retain an o-ring or similar seal element. The seal element in the groove 20K engages the interior surface of the electrical contact portion of the signal processing module 18 so as to exclude fluid entry into the electrical contact area even if the other sealing devices (such as the o-rings in grooves 20D) fail.

To assemble the connector 20 to the seismic sensor cable 12, electrical conductors 12C and a fiber reinforcing layer 12A in the cable are exposed by appropriate stripping of the cable outer jacket 12D and cable inner jacket 12B. The electrical conductors 12C are soldered, crimped or otherwise fastened to the electrical contacts 20A in the contact support wafer 20B. The contact support wafer 20B is then placed into the mating area at the axial end the shell 20F. Finally, the interior 20E is filled with uncured plastic such as polyurethane, preferably a compound sold under the trade name SMOOTH-CAST 320 by Smooth-On, Easton, Pa. Irrespective of the actual polyurethane or other plastic used to fill the interior 20E, an important characteristic of the plastic used to fill the interior 20E is that when the plastic solidifies or sets, the plastic forms what is in effect a molecular bond with the shell 20F. Advantageously, using such a polyurethane or other plastic composition having such bonding attributes transfers substantially all the axial load applied to the connector 20 equally to each individual fiber in the fiber layer 12A. Having such equalized axial load transfer can provide the maximum possible axial strength of the connector 20 as assembled to the cable 12. Additionally, using polyurethane having the described properties can substantially prevent fluid intrusion into the cable 12 or the interior 20E of the connector 20, even when the connector 20 is disengaged from the signal processing module 18, or the sealing elements (for example, O-rings in the grooves 20C, 20K) fail.

The connector 20 could be molded as a single component having all the previously explained geometric features therein, merely by locating the electrical contacts 20A in suitable positions, providing a suitably shaped mold and filling the mold with a suitable plastic compound. A possible advantage of assembling the connector as described above, however, is that the connector 20 may be entirely replaced on a seismic service vessel or in any other facility lacking suitable plastic molding fixtures using the described premolded shell 20F and the described premolded electrical contact support wafer 20B.

Still referring to FIG. 2, the housing 18A for the signal processing module 18 is preferably made from titanium, stainless steel or similar high strength material. The material is preferably resistant to crevice corrosion and stress crack corrosion. The housing 18A may be substantially cylindrical in interior and exterior shape. The housing 18A includes on its exterior surface, at its axial ends, threads 18E that are arranged to mate to corresponding threads on the interior surface of a locking element retaining ring 19. When the connector shell 20F is mated to the housing 18A, a locking element (not shown for clarity) is inserted through lock openings 18D in the housing 18A. The locking element (not shown) also engages the lock ring groove 20C formed in the shell 20F. The locking element (not shown) performs the function of axially retaining the connector shell 20F in the housing 18A. The locking element retaining ring 19 is then threaded onto the threads 18E in the housing 18A so as to cover the locking element opening 18D, thus retaining the locking element (not shown) within the locking element opening 18D.

A circuit board mounting frame 18B is inserted into the housing 18A. The circuit board mounting frame 18B has fastened thereto a circuit board 18G that includes the active circuitry of the signal processing module 18. One possible embodiment of circuitry will be explained with reference to FIG. 7. Another embodiment will be explained with reference to FIG. 10. The number of boards, and the particular circuits disposed on any embodiment of the circuit board 18G are a matter of discretion for the system designer, and will depend on the intended arrangement of seismic sensors (such as sensor 16 in FIG. 1), among other considerations. The frame 18B is preferably configured such that the circuit board 18G may be easily removed from the frame 18B when the frame 18B is removed from the housing 18A. Axial ends of the frame 18B preferably include a recess to accept an electrical contact support wafer 18J similar in configuration to the contact support wafer 20B disposed in the mating end of the connector shell 20F. Electrical contacts 18F may be molded into the wafer 18J during manufacture, similar to the wafer of the connector 20. Alternatively, the electrical contacts 18F may be molded directly into the frame 18B during manufacture. The frame 18B may be molded from plastic, preferably a polyurethane such as the previously described HYDEX compound.

The axial ends of the frame 18B also preferably include sealing portions 18H, which in the present embodiment comprise substantially cylindrical portions, sized to fit snugly inside the interior surface of the housing 18A, and include grooves 18C for o-rings or similar sealing element therein. The purpose of the sealing portions 18H, in combination with suitable sealing elements, is to exclude fluid from entering the interior of the housing 18A, thus damaging the circuit board 18G, in the event one of the connectors 20 becomes uncoupled from the housing 18A during use, or in the event the sealing elements (for example, o-rings in grooves 20D) on the connector 20 fail.

Figure 3A:
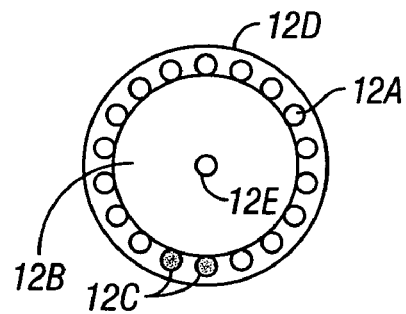
FIGS. 3A and 3B show one embodiment of a seismic sensor cable, in end view and side view, respectively.
Figure 3B:
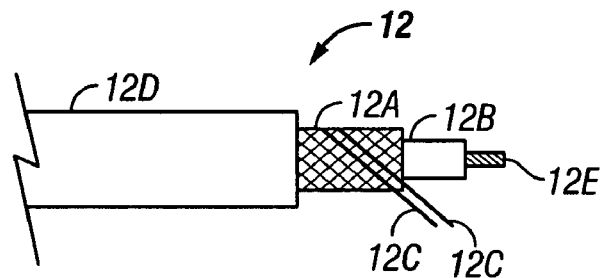

One embodiment of the seismic sensor cable 12 is shown in end view in FIG. 3A and in side cut-away view in FIG. 3B. The sensor cable 12 includes an outer sheath or jacket 12D, preferably made from polyurethane. The outer jacket 12D is intended to exclude fluid from the interior of the cable 12. Preferably, the polyurethane composition used to form the jacket 12D will provide what is in effect a molecular bond when placed in contact with uncured polyurethane, as previously explained with respect to assembly of the sealed connector (20 in FIG. 2). Other materials may be used to form the jacket 12D provided that the material selected can for a suitable bond with the material used to fill the interior (20E in FIG. 2) of the shell (20F in FIG. 2).

A woven fiber reinforcing braid 12A is disposed inside the jacket 12D. The reinforcing braid 12A may be formed from glass fiber, combination glass/graphite fiber, polymer fiber or any similar material or combination thereof known in the art for reinforcing a cable or tube. The reinforcing braid 12A should have a fiber weave, fiber size and fiber material selected to provide the cable 12 with an axial breaking strength preferably equal to about twice the expected axial loading on the cable 12 during use. In one embodiment, the intended axial load on the cable during use is at most about 1,000 lbs. In the present embodiment, the fiber braid 12A should provide the cable with an axial breaking strength of about 2,000 lbs.

In the present embodiment, some of the individual fibers or groups of fibers in the braid 12A may be substituted with small-gauge individual insulated electrical conductors or twisted pairs of insulated electrical conductors, shown at 12C. The insulated electrical conductor pairs 12C in the present embodiment are coupled at selected locations along the cable 12 to one or more seismic sensors (16 in FIG. 1), as previously explained, at a sensor takeout (14 in FIG. 1).

Disposed inside the braid 12A is an inner jacket 12B. The inner jacket 12B provides electrical insulation and a fluid-tight enclosure for a central electrical conductor 12E. The central conductor 12E is shown as a single conductor, however other embodiments of a sensor cable may include a plurality of conductors disposed inside the inner jacket. The inner jacket 12B in the present embodiment may be made from plastic sold under the trade name TEFLON by E. I. du Pont de Nemours & Co., Wilmington, Del. Other suitable materials for the inner jacket 12B are known in the art, including polyurethane.

An important purpose for the inner jacket 12B in some embodiments of the sensor cable 12 is to exclude fluid from the central conductor 12E in the event the outer jacket 12D becomes damaged to an extent that fluid is admitted through the outer jacket 12B. In one embodiment, as will be explained below with reference to FIG. 6, the central conductor(s) 12E may be used to carry electrical power and data between a central recording unit (not shown in FIGS. 3A and 3B) and one or more of the signal processing units (18 in FIG. 1). As previously explained, the insulated electrical conductors 12C disposed within the braid 12A may be used to conduct signals from one or more seismic sensors (16 in FIG. 1) disposed along the cable 12 to one of the signal processing units (18 in FIG. 1). A cable configured as shown in FIGS. 3A and 3B may thus be less susceptible to failure of power transmission and data communication (or any other function requiring unimpaired electrical insulation and continuity) along the central conductor(s) 12E in the event of failure of the outer jacket 12B. An OBC system configured as shown in FIG. 1 is thus more likely to maintain successful operation of a substantial portion of the OBC system even in the event of failure of a portion thereof by fluid intrusion into one or more of the sensor cables 12.

As previously stated, the embodiment of the cable 12 shown in FIGS. 3A and 3B includes one centrally positioned electrical conductor 12E, however, it should be understood that any number of conductors disposed inside the inner jacket 12B may also be used. The number of and size of such electrical conductors in any particular embodiment of a sensor cable will depend on application-specific criteria, including the type of data telemetry used between signal processing units and/or between a central recording unit, whether and how much electrical power is transmitted along the central conductor(s), and the length of the various individual sensor cables, among other criteria. Accordingly, the number of centrally positioned electrical conductors is not intended to limit the scope of the invention.

Electrical cable configured substantially as shown in FIGS. 3A and 3B may be used, in some embodiments, to form seismic sensor cables (12 in FIG. 1) by including a sealed connector, such as 20 in FIG. 1 (for coupling to a signal processing module) at one end and an hermaphroditic connector (as will be explained with reference to FIG. 5) at the other end. The electrical cable of FIGS. 3A and 3B may also be used to form sensor extension cables (15 in FIG. 1) by including an hermaphroditic connector at each end.

Figure 4:
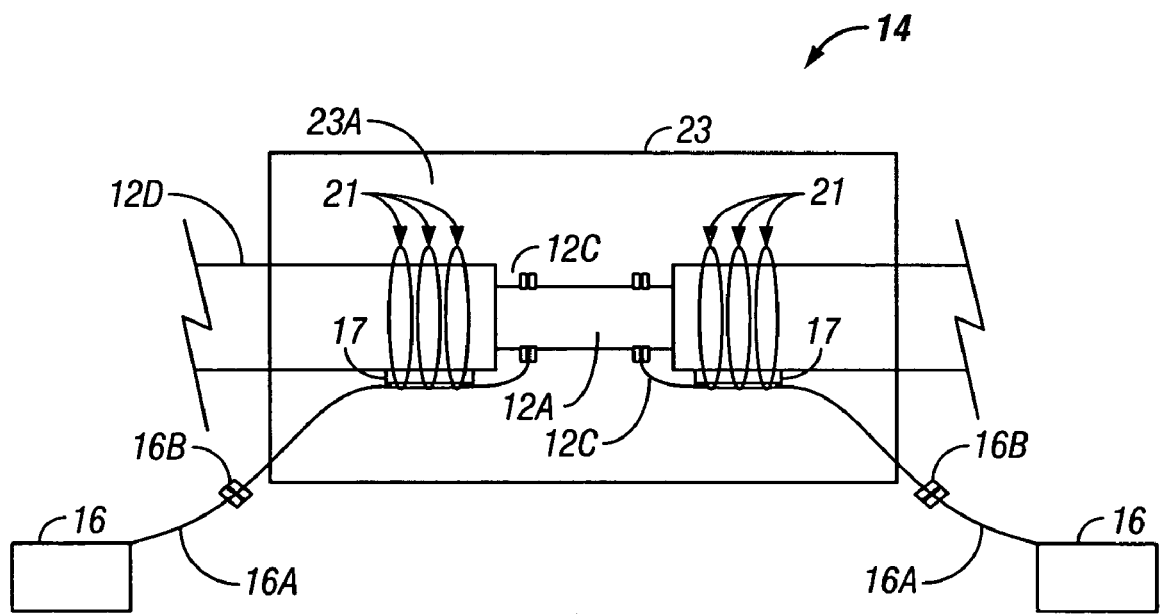
FIG. 4 shows one embodiment of a sensor takeout coupled to the example cable of FIG. 3.

One embodiment of a sensor takeout is shown in FIG. 4. The sensor takeout 14 may include a molded polyurethane outer housing 23. The outer housing 23 may be molded over the outer jacket 12D of the sensor cable 12. At a location where one or more seismic sensors 16 are to be coupled to the seismic sensor cable 12, a selected length of the outer jacket 12D may be removed from the seismic sensor cable 12, (or, alternatively, small openings may be made in the outer jacket 12D) and one or more of the twisted pairs of insulated conductors 12C is extracted from the fiber braid 12A. The conductors 12C are then electrically coupled to electrical leads 16A the seismic sensor 16. The leads 16A are mechanically affixed to the outer jacket 12D to relieve strain, using hoop wraps 21 that may be fiber, plastic or other suitable material. In some embodiments, the leads 16A may themselves be wrapped around the cable 12 to provide strain relief. Preferably, a mounting block 17 is disposed between the leads 16A and the outer jacket 12D to reduce crushing or pinching of the outer jacket 12D and leads 16A. The electrical connections between the leads 16A and the conductors 12C are preferably coated, prior to molding the outer housing 23, with a solvent evaporation-curing rubberized plastic insulating compound (not shown), such as one sold under the trade name PLASTI DIP by Plasti Dip International, Blaine, Minn. Coating may be performed by immersion, spraying or brushing. The insulating compound (not shown) helps ensure electrical insulation over the electrical connections between the conductors 12C and the leads 16A in the event of fluid intrusion into the outer housing 23.

After assembly of the leads 16A to the cable 12, as explained above, the outer housing 23 may then be molded over the cable 12. In the present embodiment, each of the sensor leads 16A includes a pressure-sealed electrical/mechanical connector 16B to enable changing sensors 16, if sensor failure should occur, without the need to rebuild the sensor takeout 14. Other embodiments may omit the connector 16B. Suitable connectors for the purpose of making electrical and mechanical connection between the sensor 16 and the sensor takeout 14 are well known in the art.

The sensor takeout 14 shown in FIG. 4 includes two individual seismic sensors 16, however, the number of sensors used in other embodiments of a takeout may be more or fewer. The sensor takeout shown in FIG. 4 has been successfully tested to resist fluid intrusion at an external fluid pressure equivalent to a water depth of 300 meters.

Figure 5:
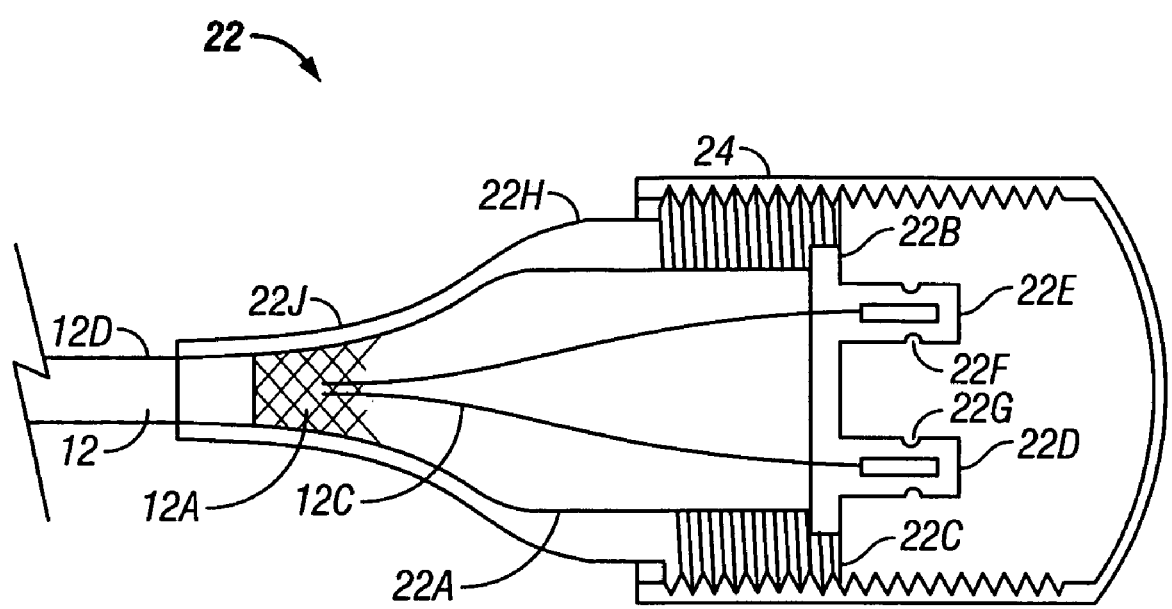
FIG. 5 shows one embodiment of an hermaphroditic connector used to couple the cable of FIG. 3 to a like or different sensor cable.

One embodiment of an hermaphroditic connector as used on the sensor cable 12 and on sensor extension cables (15 in FIG. 1) is shown in FIG. 5. The connector 22 in the present embodiment includes a molded outer shell 22H which may be formed from polyurethane, similar to the HYDEX compound used for the connector shell (20F in FIG. 2) shown in FIG. 2. The hermaphroditic connector shell 22H includes an interior bore or passage 22A that terminates in a receptacle for receiving an electrical contact support wafer 22B. The interior passage 22A of the shell 22H is preferably no smaller than needed to enable free passage of the sensor cable 12. The shell 22H includes a threaded portion 22C molded into its exterior surface at one axial end, for coupling to a corresponding one of the hermaphroditic connectors, as will be further explained. The shell 22H preferably includes a bend radius transition 22J to avoid excessive bending stress on the sensor cable 12 during handling and operation.

The support wafer 22B is preferably molded from the same or similar polyurethane material from which the shell 22H is molded. Electrical contacts are appropriately arranged inside male 22E and female 22D contact sealing tubes. The contacts are molded into the body of the wafer 22B during manufacture. The contact sealing tubes 22D, 22E, preferably include integrally molded seal rings 22G, 22F respectively, such that when the sealing tubes 22D, 22E are mated with corresponding sealing tubes on another one of the hermaphroditic connectors, the sealing tubes 22D, 22E are sealed against intrusion of fluid.

During assembly of the connector 22, electrical conductors 12C in the cable 12 are coupled to the electrical contacts in the sealing tubes 22E, 22D, such as by soldering, crimping or other method known in the art. The contact wafer 22B is then placed in its receptacle at the axial end of the shell 22H. The interior of the shell 22A is then filled with uncured polyurethane, such as the previously described SMOOTH-CAST 320 compound. When cured, the polyurethane compound forms what is essentially a molecular bond to the shell 22H, to the cable outer jacket 12D and to the contact wafer 22B. Having such a bond between the various components of the interior of the connector 22 minimizes the possibility of fluid intrusion into the interior of the connector 22 and the cable 12, even in the event the connector 22 becomes disengaged from its mating hermaphroditic connector.

As previously explained with respect to FIG. 1, axial load is transferred between mated ones of the hermaphroditic connectors 22 by a threaded coupling ring 24 threaded over the threaded portions 22C formed into each mating connector shell 22H. Also as previously explained, it is desirable to have a threaded ring 24 disposed at each end of sensor extension cables (15 in FIG. 1) which have an hermaphroditic connector at both ends. The hermaphroditic connector shown in FIG. 4 has been successfully tested to resist an externally applied fluid pressure equivalent to a water depth of 300 meters.

Figure 6:
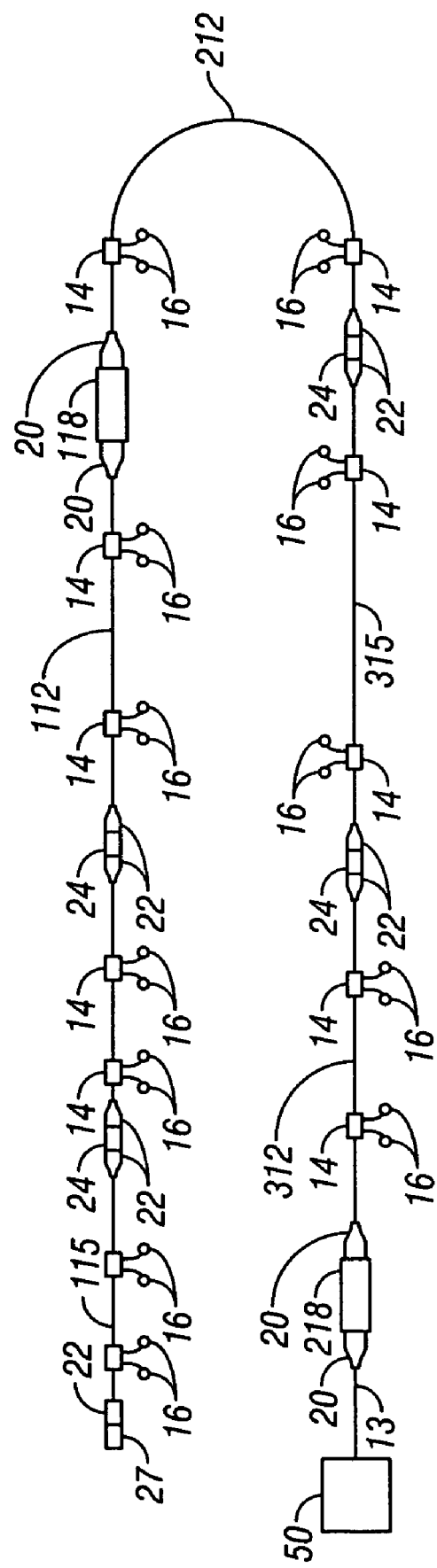
FIG. 6 shows one embodiment of sensor cables, additional sensor cables, seismic sensors and signal processing modules according to the invention.

One example arrangement of the various components of a system according to the invention is shown in FIG. 6. A first sensor extension cable including hermaphroditic connectors at each end is shown at 115. The first sensor extension cable 115 includes two sensor takeouts 14. Each takeout 14 includes two seismic sensors 16. One end of the first sensor extension cable 115 includes a plug 27 in the hermaphroditic connector 22 to seal the connector 22 against fluid entry. The first sensor extension cable 115 is coupled at its other end to one end of a similarly formed, second sensor extension cable 215 using a threaded ring 24 to threadedly connect two of the hermaphroditic connectors 22. The second sensor extension cable 215 includes two sensor takeouts 14 each having two seismic sensors 16 coupled thereto.

The second sensor extension cable 215 is coupled at its other end to one end of a first sensor cable 112. The first sensor cable 112 may be formed with an hermaphroditic connector 22 at one end, and a sealed connector 20, as described with reference to FIG. 2, at the other end. The first sensor cable 112 includes two sensor takeouts 14 each having two seismic sensors 16 coupled thereto.

The other end of the first sensor cable 112 is coupled to a first signal processing module 118. The first signal processing module 118 may be formed as explained above with reference to FIG. 2. In the arrangement shown in FIG. 6, the circuits (not shown separately) in the first signal processing module 118 interrogate the various sensors "downstream" (from the first module 118 to the end of the first additional sensor cable 115) from the first module 118 and convert the signals thus interrogated into a form suitable for transmission "upstream" through a second sensor cable 212, through a third sensor extension cable 315, through a third sensor cable 312, to a second signal processing module 218 for inclusion in signal telemetry sent from the second signal processing module, through a data communication cable 13 to a recording unit 50. As previously explained with reference to FIGS. 3A and 3B, transmission of processed signals upstream from the first module 118 to the second module 218 is preferably along one or more centrally positioned conductors (not shown separately) in each of the third sensor extension cable 315 and second and third sensor cables, 212, 312, respectively, so that in the event of failure of the outer jacket on any of these cables 215, 212, 312, or failure by fluid intrusion at any of the sensor takeouts 14, signal communication with the still-operative sensors 16 may continue, and data communication upstream may continue. In some embodiments, command signals may be transmitted from the recording unit 50 to each of the modules 118, 218 to control various aspects of the signal processing, particularly time indexing. Such command signals are also preferably transmitted along the central conductor(s) to reduce the chance of communication failure.

The second 212 and third 312 sensor cables are similar in configuration to the first sensor cable 112. The third sensor extension cable 315 is similar in configuration to the first 115 and second 215 sensor extension cables. The data communication cable 13 preferably only includes a central conductor as explained with reference to FIGS. 3A and 3B, deleting the twisted pairs of conductors disposed in the fiber reinforcing braid, because no sensor takeouts are included in the data communication cable 13. The recording unit 50 may be a conventional recording unit known in the art for use with OBC systems.

Figure 7:
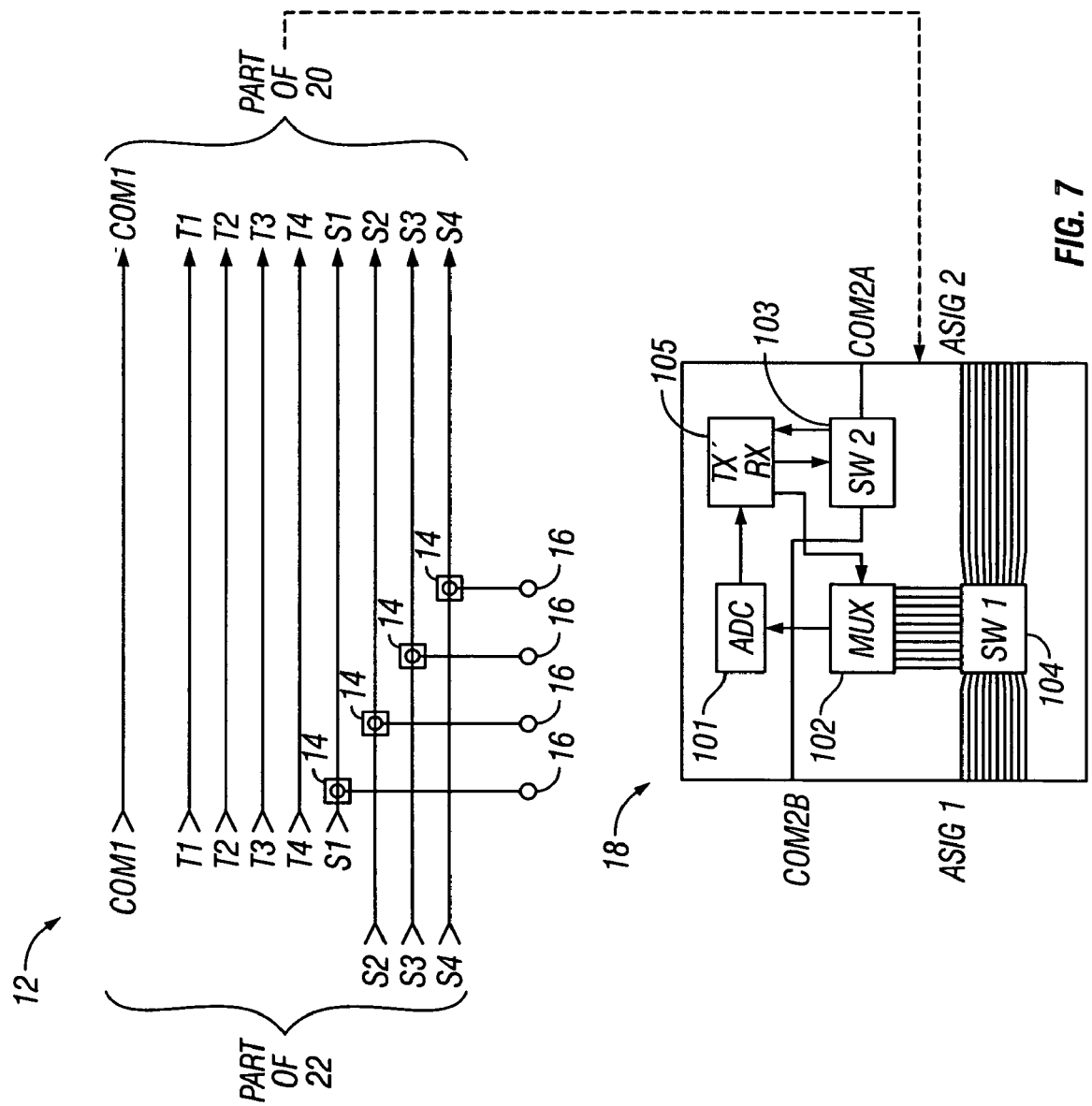
FIG. 7 shows a functional block diagram of one possible embodiment of a sensor cable and a signal processing unit.

A functional block diagram of one possible embodiment of a sensor cable (12 in FIG. 6) and a signal processing module (18 in FIG. 6) is shown in FIG. 7. The sensor cable 12 in the present embodiment includes eight of the twisted pairs of exterior electrical conductors (12C in FIGS. 3A and 3B) for conducting signals from seismic sensors 16 connected to the sensor cable 12 to the signal processing module 18. Each sensor 16 is coupled to its respective twisted pair (shown as single lines) S1, S2, S3, S4 by a sensor takeout 14 made as explained earlier with respect to FIG. 4. The other four twisted conductor pairs, indicated by lines T1, T2, T3, T4 are "through" conductors for carrying analog signals such as may be generated by sensors in another sensor cable. The twisted pairs of conductors T1–T4 and S1–S4 terminate in a sealed connector 20 at one end of the sensor cable 12. The sealed connector 20 may be formed substantially as explained with respect to FIG. 2. The sealed connector 20 mates with a corresponding connector (not shown separately) on the signal processing module 18. The sensor cable 12 may include a data communication conductor COM1, disposed within the inner cable jacket (as explained with reference to FIGS. 3A and 3B). In the embodiment of FIG. 7, the data communication conductor COM1 may carry telemetry and/or electrical power depending on the particular connections to each end of the sensor cable 12.

The signal processing module 18 in the present embodiment includes within its circuits a telemetry transceiver 105 for detecting command signals from the recording unit (50 in FIG. 6). The telemetry transceiver 105 preferably also performs the functions of a system controller. Programmable integrated circuits such as ASICs (application specific integrated circuits) are known in the art for performing the functions of the transceiver/controller as described herein. On power up, the transceiver 105 may be programmed to detect which one of the communications ports COM2A or COM2B includes command signals from the recording unit (50 in FIG. 6). As can be inferred from the description with reference to FIG. 2, the communications ports COM2A, COM2B form part of the electrical and mechanical connectors arranged to mate with sealed connectors 20 on either the sensor cable 12 or the data communication cable (13 in FIG. 6). Depending on which communications port COM2A or COM2B is determined to be the source for command signals, the transceiver 105 operates a telemetry port switch 103 to couple telemetry signal output to the same communications port. The other communications port COM2B or COM2A will be selected to receive "downstream" telemetry from any other signal processing units. One such arrangement of downstream signal processing unit has been explained with reference to FIG. 6. Depending on which communications port is determined to be the "upstream" port, an analog signal input switch 104 selects which connector will be a source for analog signals from the seismic sensors 16 located "downstream" from the signal processing unit 18. In FIG. 7 these connectors are indicated by ASIG1 and ASIG2. It should be noted that the electrical contacts for the communications ports COM2A and COM2B in the present embodiment are disposed within each of the same electrical/mechanical connectors as contains the analog signal ports ASIG1 and ASIG2.

Depending on which analog signal ports ASIG1 or ASIG2 is selected by the analog signal input switch 104, the selected analog signal input may be coupled to a multiplexer (MUX) 102 to convert parallel analog inputs from the selected analog signal port to serial input. The serial input may then be digitized in an analog to digital converter (ADC) 101 for filtering (such as by a finite impulse response filter) and buffering in the transceiver 105. Buffered signal data may be transmitted upstream on the selected data communication port when commanded by the recording unit (50 in FIG. 6) or in a preprogrammed telemetry format. The actual telemetry format is a matter of discretion for the system designer and is not intended to limit the scope of the invention.

The "downstream" data communication port, COM2A or COM2B depending on the command signal detection as previously explained, may be periodically interrogated by the transceiver 105 for the presence of data being communicated upstream by another signal processing module (not shown in FIG. 7).

Figure 8:
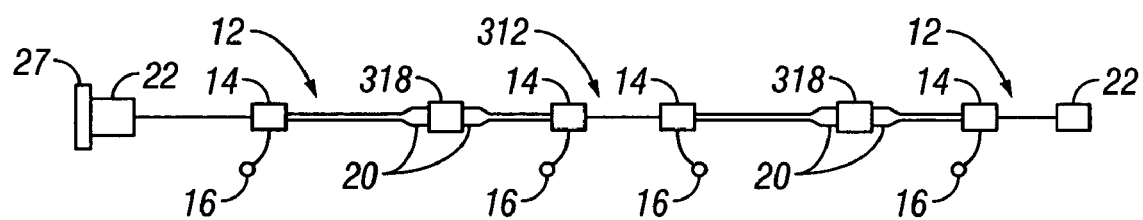
FIG. 8 shows an alternative embodiment of a sensor system.

In some embodiments, performance of the sensor system may be improved by limiting the number of analog sensor signals with respect to the number of signal processing modules. FIG. 8 shows an alternative embodiment of a seismic sensor system according to the invention that may provide such improved performance. The system includes sensor cables 12 that may be made substantially as explained with reference to FIGS. 2, 3A, 3B, 4 and 5. Each of the sensor cables 12 in the present embodiment of the system includes one sensor takeout 14. Each sensor takeout 14 on each sensor cable 12 has one seismic sensor 16 coupled thereto. One end of each sensor cable 12 is terminated in a sealed connected 20 of the type (as explained above with reference to FIG. 2) adapted to connect to a signal processing module, shown at 318 in FIG. 8. One arrangement of internal components of the signal processing modules 318 for the present embodiment will be explained below with reference to FIG. 10. The other end of each sensor cable 12 terminates in an hermaphroditic connector 22, which may be made substantially as explained with reference to FIG. 5. Two of the signal processing modules 318 may be directly interconnected to each other by a sensor interconnect cable 312. The sensor interconnect cable 312 may be made substantially as one of the sensor cables 12, and includes two sensor takeouts 14, each with one associated seismic sensor 16. The sensor interconnect cable 312 in the present embodiment is terminated at each end by one of the sealed connectors 20, so as to be able to be coupled at each end to a signal processing module 318.

In the example system shown in FIG. 8, one end of one of the sensor cables 12 is terminated with a plug 27 coupled to the hermaphroditic connector 22 at the end of one of the sensor cables 12. The other end of the one sensor cable 12 is connected to one end of a signal processing module 318. The signal processing module 318 is connected at its other end to one end of the sensor interconnect cable 312. The other end of the sensor interconnect cable 312 is connected to one end of a second signal processing module 318. The other end of the second signal processing module 318 is connected to one end of a second sensor cable 12. The other end of the second sensor cable 12 is terminated in an hermaphroditic connector 22. The system shown in FIG. 8 may itself be coupled to another such system at its "upstream" end (the open end of the hermaphroditic connector 22 on the end of the second sensor cable 12). Some embodiments may include a plurality of systems as shown in FIG. 8 coupled end-to-end, terminating in a recording unit (such as shown at 50 in FIG. 6). The system shown in FIG. 8 may itself terminate in a recording unit (such as shown at 50 in FIG. 6). Irrespective of the exact number of systems coupled end to end, it is contemplated that electrical power and digitized signals are to be communicated along inner conductors (12E in FIG. 3A) between the recording unit and one or more signal processing modules. Analog signals from the various sensors 16 are conducted from the sensors 16 to one of the signal processing modules over the twisted pairs of conductors (12C in FIG. 3A) disposed in the fiber reinforcing braid (12A in FIG. 3A). The system shown in FIG. 8 thus may have the advantages explained with respect to the system of FIG. 6, namely that in the event an outer jacket on one or more of the sensor cables 12 becomes damaged, and fluid intrudes past the outer jacket, power and digitized signals may continue to be communicated between the recording unit and the various signals processing modules because the inner jacket would continue to exclude fluid from entering the inner conductor(s).

Figure 9:
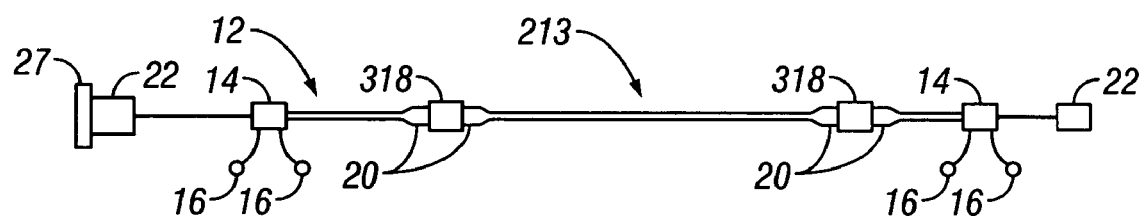
FIG. 9 shows an alternative embodiment of a sensor system.

An alternative arrangement including two seismic sensors on each sensor takeout is shown in FIG. 9. The system in FIG. 20 includes two seismic sensor cables 12, which may be made substantially as explained with reference to FIGS. 2, 3A, 3B, 4 and 5. Each sensor cable 12 is terminated with a sealed connector 20 at one end and an hermaphroditic connector 22 at the other end. Each sensor cable 12 includes one takeout 14, each of which is coupled to two seismic sensors 16. Each sensor cable 12 is coupled at the sealed connector 20 end to one end of a signal processing module 318. One end of the system shown in FIG. 9 includes a plug 27 in the open end of one of the hermaphroditic connectors 22. The other end of the system, terminated by open hermaphroditic connector 22 may be connected to another system "upstream" thereof, or may terminate in a recording unit (such as shown at 50 in FIG. 6). The system shown in FIG. 9 includes a module interconnect cable, shown at 213. The module interconnect cable 213 is terminated at each end by a sealed connector. The module interconnect cable 213 may be electrically and mechanically configured similar to the previously described data communication cable (13 in FIG. 6) and is adapted, in the present embodiment, to carry only electrical power and digitized signals between signal processing modules 318, and therefore has no sensor takeouts or electrical conductors disposed within the fiber braid (12A in FIG. 3B).

Figure 10:
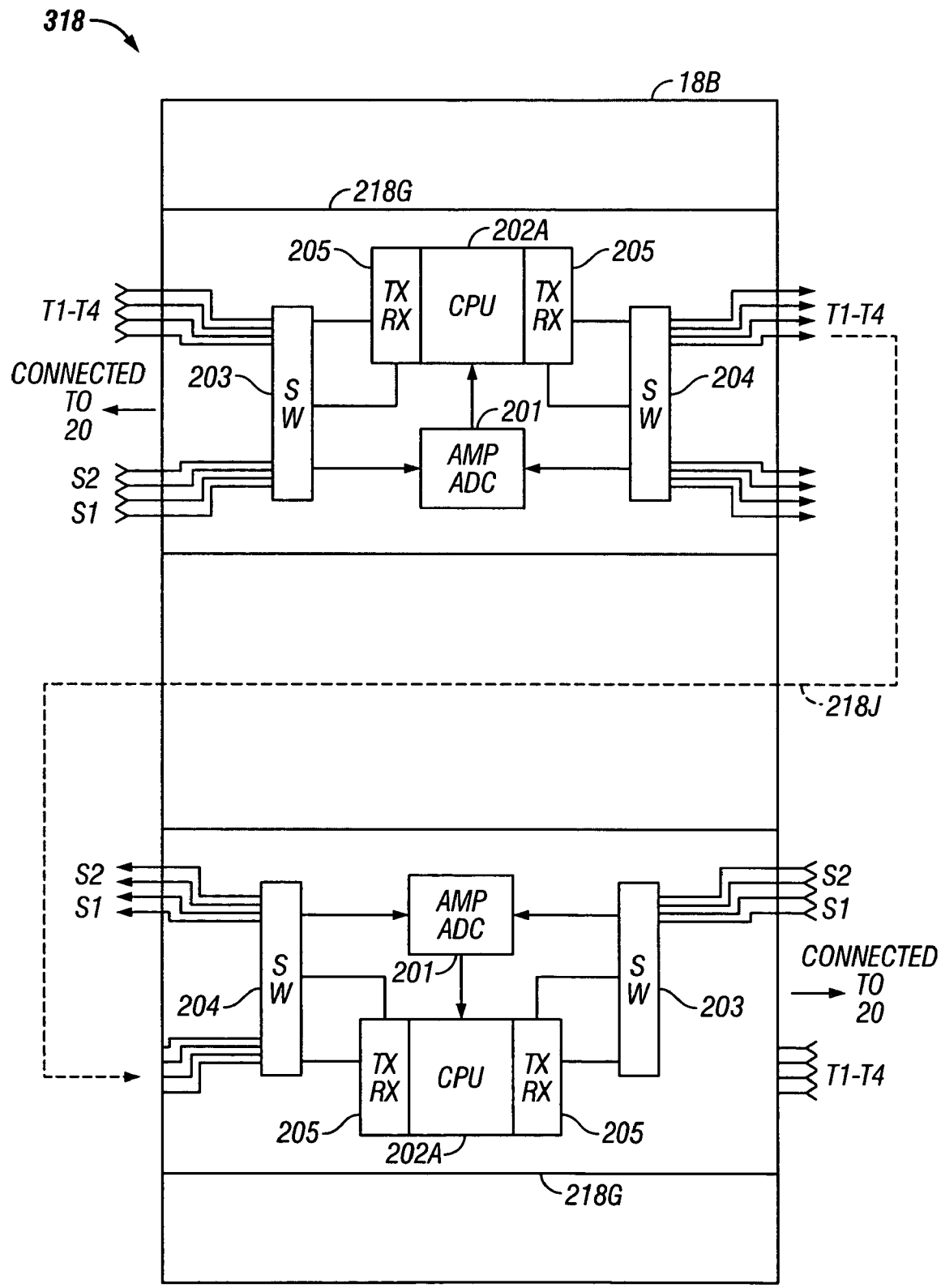
FIG. 10 shows an alternative embodiment of a signal processing module.

One example of a signal processing module suitable for the systems shown in FIGS. 8 and 9 is shown in block diagram form in FIG. 10. The module 318 in this embodiment includes two substantially identical circuit boards 218G disposed in the frame 18B in opposed directions, such that irrespective of which end of the module 318 is connected to a particular cable (such as interconnect cable 213 in FIG. 9 or sensor cable 12 in FIG. 9, for example) the circuits connected to that cable will be the same. Each board 218G includes a central processor (CPU) 202A which, among other functions, controls operation of Tx/Rx switches 205 and amplifier/ADC units 201. As in the previously described embodiments of the signal processing module, detection of command signals by the CPU 202A will establish which end of the module 318 is coupled to the "upstream" part of the system (in the direction of the recording unit), and thus in which direction digitized signals are to be received from downstream modules, and to where digitized signals are to be transmitted for recording or retransmission by another signal processing module, depending on the configuration used. Command signals may also be used to instruct the CPU 202A to detect analog signals from particular ones of various analog signal input terminals S1, S2.

Each circuit board 218G preferably has two sets of analog signal terminals S1, S2, and two sets of power/telemetry input/output terminals T1–T4. In the present embodiment, connector terminations are arranged such that one set of analog signal terminals and one set of digital signal terminals can mate with corresponding terminals in one sealed connector (20 in FIG. 2) coupled to one end of the module 318, while at the other end of the module 318, a similar set of analog signal terminals and a similar set of digital signal terminals can mate with corresponding terminals in another sealed connector (20 in FIG. 2) coupled to the other end of the module 318. Digital signal communication and power transfer between the two boards 218G in the module 318 are made, in the present embodiment, by an internal jumper 218J. When used in the embodiment of the system shown in FIG. 8, analog signals are input to each end of the module 318. When used in the system embodiment of FIG. 9, analog signals are input only at one end of the module 318.

The various aspects of the invention provide components for an OBC system that are inexpensive to manufacture, deploy efficiently, and are more resistant to fluid intrusion and associated failure than are similar systems known in the art.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A signal processing module for a seismic sensor system, comprising:
  a housing;
  a circuit mounting frame disposed within the housing, the frame having sealing features thereon to sealingly engage an interior surface of the housing so as to define a chamber sealed from fluid entering therein, the mounting frame including electrical contacts disposed at each of two ends thereof, the electrical contacts sealed to the frame such that water is substantially prevented from entering the chamber when the contacts are exposed to water; and
  signal processing circuits mounted to the frame within the chamber, the signal processing circuits comprising means for detecting command signals originating from a recording unit operatively coupled to the module from one of the two electrical contacts, the signal processing circuits comprising means for electrically coupling the other one of the two electrical contacts to means for receiving signals from a seismic sensor.

2. The module as defined in claim 1 wherein the circuits comprise means for receiving signals from at least one seismic sensor and means for performing at least one of formatting the sensor signals for telemetry, buffering the signals for transmission transmitting formatted signals to another signal processing unit and transmitting the formatted signals to a recording unit.

3. The module as defined in claim 1 wherein the signal processing circuits include means for selectively electrically coupling a telemetry output thereof to the one of the terminations from which the command signals are detected.

* * * * *